United States Patent [19]

Cohen et al.

[11] Patent Number: 5,200,208
[45] Date of Patent: Apr. 6, 1993

[54] MULTI-STATION RUBBER INJECTION MOLDING MACHINE

[75] Inventors: Zachariha Cohen, Cleveland Heights; Robert L. Luck, Mentor, both of Ohio

[73] Assignee: US Molding Machine Company, Mentor, Ohio

[21] Appl. No.: 232,425

[22] Filed: Aug. 11, 1988

[51] Int. Cl.⁵ .................................... B29C 45/18
[52] U.S. Cl. ................................ 425/566; 425/572
[58] Field of Search ............ 425/145, 147, 566, 571, 425/552, 572, 588, 567, 562, 570, 563

[56] References Cited

U.S. PATENT DOCUMENTS

| | | | |
|---|---|---|---|
| 2,871,517 | 2/1959 | Allard | 425/572 X |
| 3,671,162 | 6/1972 | Lohmann | 425/563 |
| 3,807,921 | 4/1974 | Murgatroyd | 425/562 X |
| 4,005,964 | 2/1977 | Bishop | 425/588 |
| 4,080,147 | 3/1978 | Dumortier | 425/552 X |
| 4,090,837 | 5/1978 | Balevski et al. | 425/588 |
| 4,106,887 | 8/1978 | Yasuike et al. | 425/566 X |
| 4,389,358 | 6/1983 | Hendry | 425/572 X |
| 4,586,887 | 5/1986 | Gellert | 425/572 X |

FOREIGN PATENT DOCUMENTS

| | | | |
|---|---|---|---|
| 2613173 | 9/1977 | Fed. Rep. of Germany | 425/570 |
| 166030 | 10/1983 | Japan | 425/588 |

OTHER PUBLICATIONS

LINEA 80 brochure.
REP Rubber Injection brochure.
Exploding with Technology From the Best Injection Molding Machnes in America brochure, U.S. Molding Machinery Company.

*Primary Examiner*—Richard L. Chiesa
*Attorney, Agent, or Firm*—Renner, Otto, Boisselle & Sklar

[57] ABSTRACT

A multi-station rubber injection molding machine including plural molding stations for respective molds, a rubber injection unit, and a manifold assembly for selectively transferring uncured rubber from the rubber injection unit to a mold in any one of the molding stations. The manifold assembly includes an inlet for receiving molding material from the injection unit and a plurality of nozzle members each including a transfer passage and being movable into and out of operative engagement with a mold in the respective molding station. Each nozzle member has associated therewith members for connecting and disconnecting the transfer passage therein to and from the inlet respectively in response to movement of the nozzle member into and out of operative engagement with the mold.

18 Claims, 4 Drawing Sheets

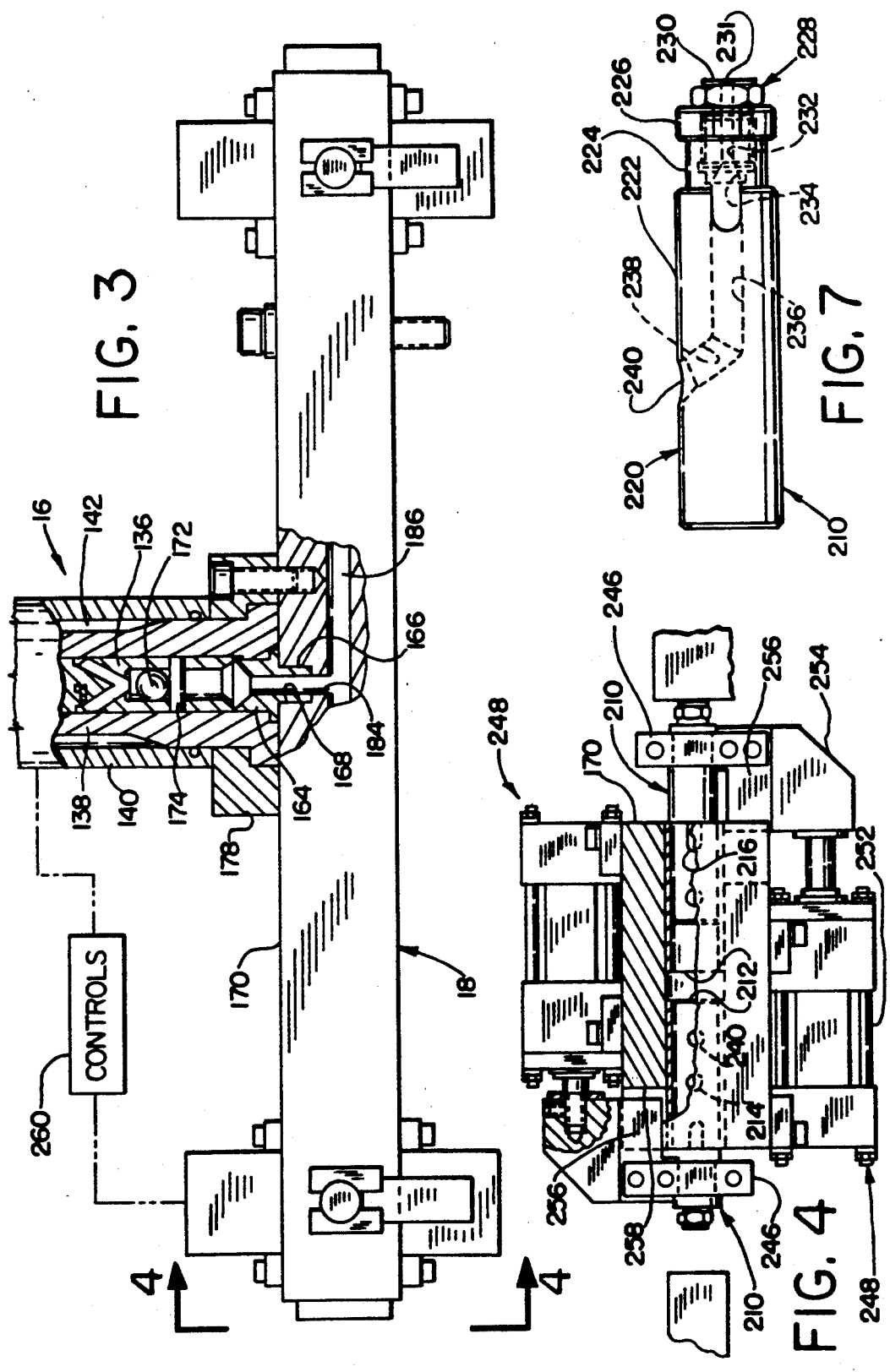

MULTI-STATION RUBBER INJECTION MOLDING MACHINE

FIELD OF THE INVENTION

The invention herein described relates generally to a rubber injection molding machine and, more particularly, to a rubber injection molding machine including an injection unit shared by multiple clamping units.

BACKGROUND OF THE INVENTION

Known rubber injection molding machines commonly include a press or clamping unit for a mold and an injection unit for injecting uncured rubber into the mold. The mold typically includes upper and lower mold halves or parts which are heated and clamped together under high pressure by the clamping unit. The injection unit has an injection nozzle through which the uncured rubber is injected into the mold for cure under pressure and high temperature conditions. Rubber injection molding machines of various press clamping forces and injector shot capacity are manufactured by U.S. Molding Machinery Company of Mentor, Ohio.

In a typical machine cycle, the mold is clamped in the clamping unit and then uncured rubber is injected into the mold by the injection unit. The rubber is then cured (vulcanized) in the mold for a prescribed time after which the press is opened for removal of the molded rubber product from the mold. After this the press is again closed to commence another machine cycle and production of another molded rubber product.

During the curing and/or product removal phases of the machine cycle, the injection unit may be recharged for the next machine cycle. The recharging time often is considerably shorter than the time needed to cure the rubber and remove the cured rubber product. Consequently, the injection unit may be idle for a substantial portion of the total cycle time. As has been recognized in the art of rubber injection molding for some time, advantage can be taken of this idle time in relation to one mold by using the injection unit to inject a charge into another mold or molds.

One known rubber injection molding machine includes a single injection unit which may be shared by up to six press units in respective stations of the machine. The press units are arranged in a row and the injection unit is shifted laterally from station to station thereby sequentially to inject a charge into the mold clamped at each station. This technique of moving the injection unit from one station to another is subject to several drawbacks. One drawback is the relatively high cost and complexity of the mechanism and controls needed to shuttle the injector unit between stations. The moving injector unit also creates concerns about misalignment between the injection unit and the molds which may cause such problems as leakage and excessive wear.

Another known rubber injection molding machine includes a single station press equipped with traveling carriages for two molds and associated hardware. When the press is opened, one mold is shifted out of the press to an ejector station at one side of the press while the other mold is shifted into the press from an ejector station at the opposite side of the press. The press is then closed and a charge is injected into the mold by an injection unit mounted atop the press. This press has advantage in those applications where long open times are needed or considerable clearance is required for stripping.

SUMMARY OF THE INVENTION

The present invention provides a beneficial press wherein an injector unit is shared by multiple press stations to obtain increased yield in relation to a single station press. The invention obtains this fundamental benefit and other advantages in a novel manner which avoids problems associated with the above described multi-station machine.

According to the invention, a multi-station rubber injection molding machine comprises plural molding stations for respective molds, a rubber injection unit, and a manifold assembly for selectively transferring uncured rubber from the rubber injection unit to a mold in any one of the molding stations. The manifold assembly includes an inlet for receiving molding material from said injection unit and plural nozzle members including respective transfer passages. The nozzle members are movable from a first position to a second position for operatively connecting the transfer passage in the nozzle member to a respective mold, and the nozzle members each operate to connect the transfer passage therein to said inlet when in the second position and to disconnect the transfer passage therein from the inlet when in the first position. Actuators are provided for moving respective ones of the nozzle members between the first and second positions independently of movement of the other nozzle members.

According to another aspect of the invention, an injection molding machine comprises a plurality of molding stations for respective molds, an injection unit, and a manifold assembly. The manifold assembly includes an inlet for receiving molding material from the injection unit and a plurality of nozzle members each including a transfer passage and being movable into and out of operative engagement with a mold in the respective molding station. Each nozzle member has associated therewith means for connecting and disconnecting the transfer passage therein to and from the inlet respectively in response to movement of the nozzle member into and out of operative engagement with the mold. At least two nozzle members each have associated therewith a respective actuator for moving the nozzle member independently of movement of the other one of the two nozzle members. Preferably the manifold includes a manifold block in which said nozzle members are slidably movable, and each molding station comprises a clamping unit.

In a preferred embodiment, there are four clamping units in a rectangular arrangement, and the manifold includes a manifold block located generally centrally of said four clamping units. Four nozzle members are slidably movable in bores in the manifold block at locations adjacent respective ones of said four clamping units. Preferably provision is made for controlling the temperature of the manifold block.

A preferred form of manifold block includes a longitudinally extending main delivery passage in communication at a central location with the inlet, and a pair of branch passages at each opposite end of the main delivery passage. Each branch passage terminates at a bore in the manifold block in which a respective one of the nozzle members is movable. Each pair of branch passages preferably forms a Y with the main delivery passage and terminate at a bore opening in the wall of a respective one of the bores in which the nozzle members move. The nozzle members each having a body including a transfer passage which has an inlet opening and a nozzle outlet opening, and the inlet opening is aligned with the corresponding bore opening when the nozzle member is moved into operative engagement with the mold and out of alignment when the nozzle member is moved out of engagement with the mold.

The invention comprises the foregoing and other features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 3 is an enlarged elevation view, partly broken away in section, showing an injection manifold assembly according to the present invention;

FIG. 4 is an end elevation view, partly broken away in section, of the injection manifold assembly, looking from the line 4—4 of FIG. 3;

FIG. 7 is an elevation view of one of plural slide nozzle assemblies included in the injection manifold assembly.

DETAILED DESCRIPTION OF THE PREFERRED EMBODIMENT

Figure 1:
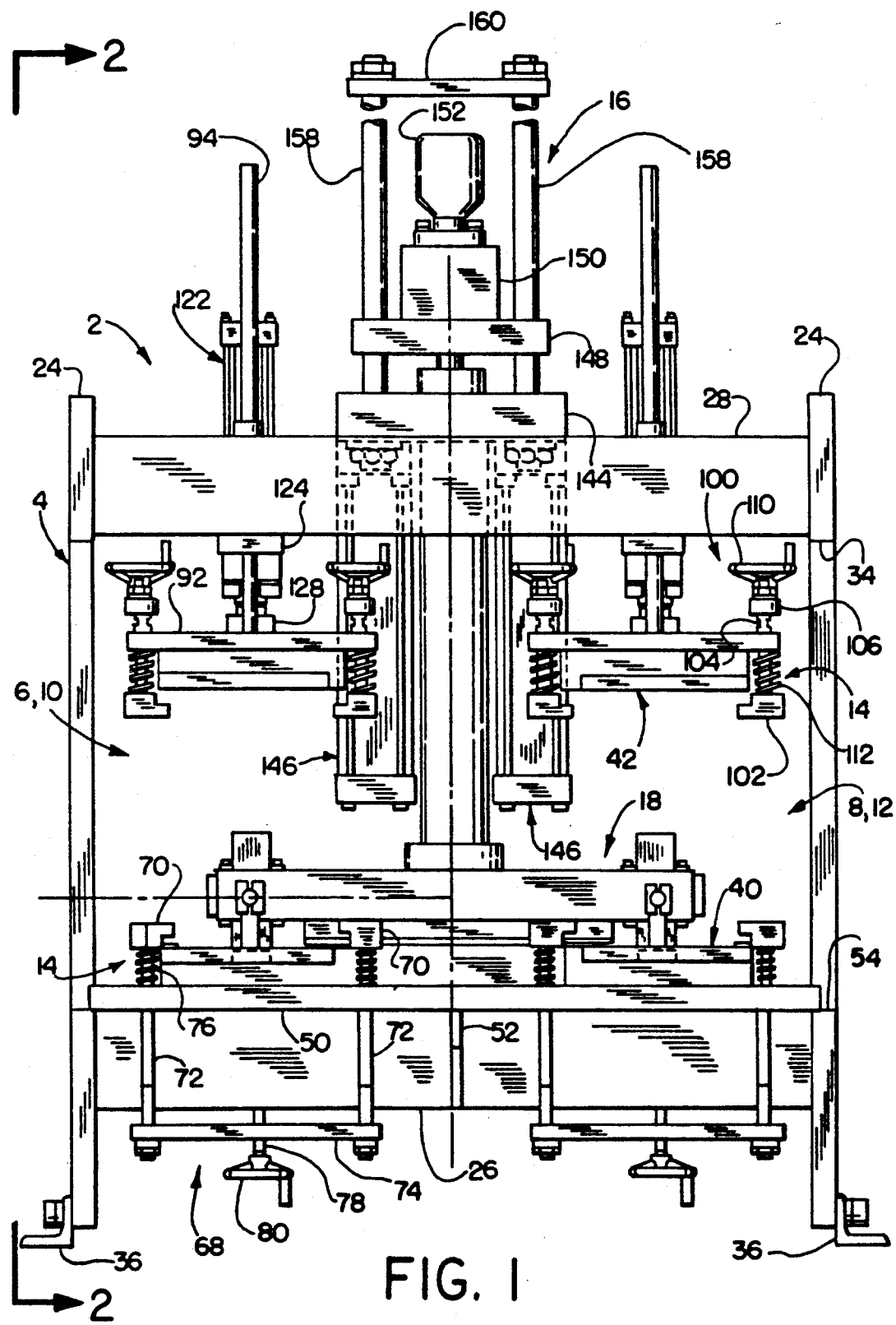
FIG. 1 is a front side view of a multi-station rubber injection molding machine according to the present invention.
Figure 2:
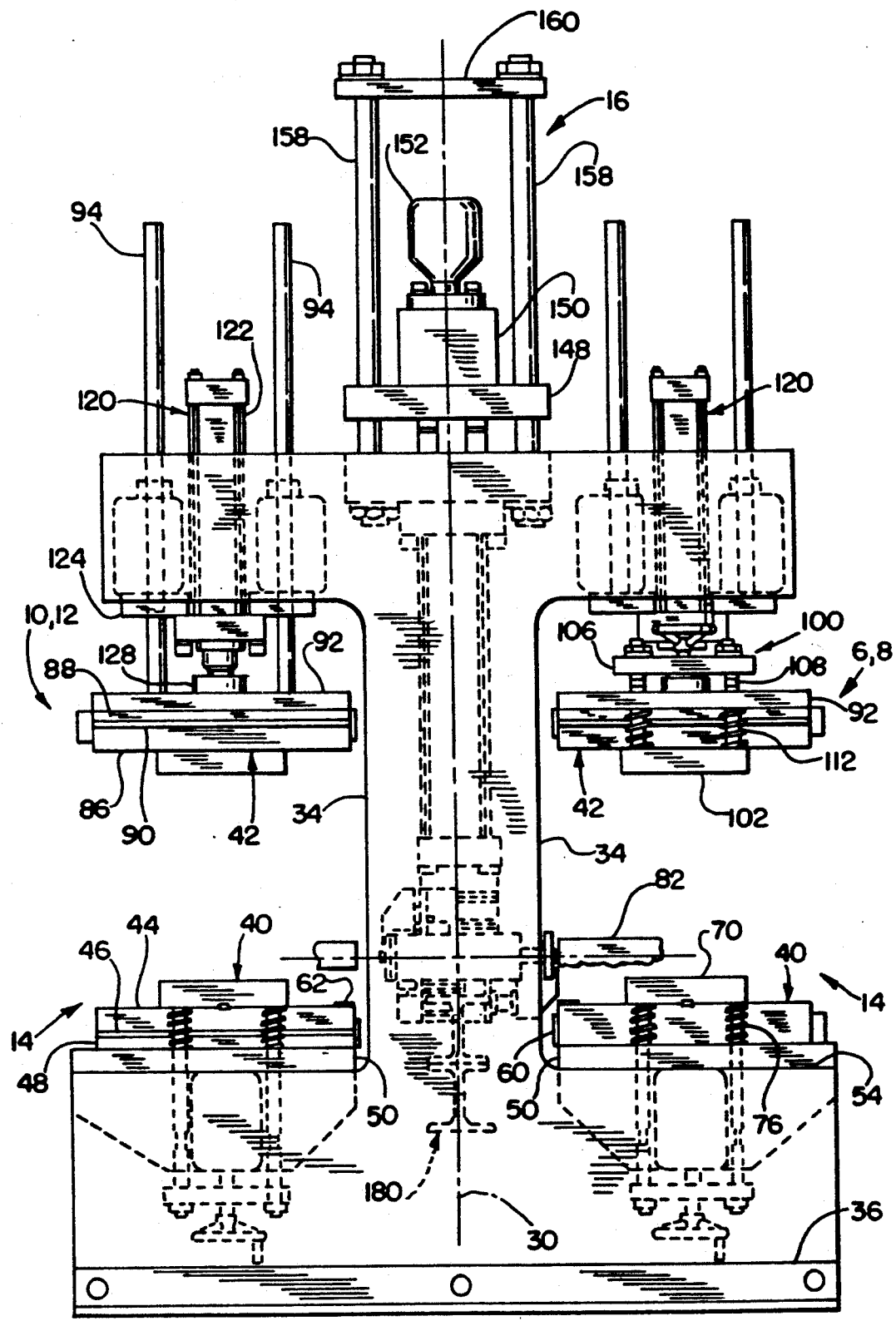
FIG. 2 is an end side elevation view of the injection molding machine of FIG. 1, looking from the line 2—2 thereof.

In FIGS. 1 and 2, a multi-station rubber injection molding machine according to the present invention is indicated generally at 2. The injection molding machine 2 generally comprises a frame 4, a plurality of molding stations 6, 8, 10 and 12 each including a press or clamping unit 14, an injection unit 16 and an injection manifold assembly 18. In the hereinafter described manner, the injection manifold assembly selectively transfers uncured rubber molding material from the injection unit to molds clamped by the clamping units in the molding stations. The illustrated injection molding machine is equipped with a rectangular arrangement of four molding stations as is preferred. However, principles of the present invention have application to injection molding machines having a different number and/or different arrangement of molding stations, the number and/or arrangement being varied as may be desired for particular applications. Principles of the invention may also have application to an injection molding machine including two or more injection units each having associated therewith a manifold assembly operative in accordance with the invention selectively to transfer uncured rubber molding material to plural molding stations or clamping units.

In the illustrated preferred embodiment of an injection molding machine according to the invention, the frame 4 comprises a pair of vertical side plates 24 which are transversely spaced apart and connected together by two lower cross beams 26 and four upper cross beams 28. The lower and upper cross beams 26 and 28 extend horizontally and transversely between the side plates 24 and are secured at their ends as by welding to the side plates 24. As best seen in FIG. 2, the lower cross beams 26 are respectively located forwardly and rearwardly of the vertical transverse center plane 30 of the injection molding machine 2 whereas the upper cross beams 28 are arranged in pairs respectively located forwardly and rearwardly of the vertical transverse center plane 30. Moreover, the upper cross beams 28 at the front and back of the machine are located above and centered with respect to the corresponding lower cross beam 26. This arrangement is particularly desirable for mounting and supporting a pair of clamping units 14 for molding stations 6 and 8 at the front side of the machine and another pair of clamping units for molding stations 10 and 12 at the back side of the machine.

As is preferred, the side plates 24 are each provided with front and rear windows 34 to provide end side access to an adjacent clamping unit 14. As seen in FIG. 2, these windows 34 may be large C-shape notches or 14. As seen in FIG. 2, these windows 34 may be large C-shape notches or recesses in the side plates which consequently have an I-shape. Along their lower edges the side plates 24 may be provided with frame mounting angles 36 for mounting to a floor or other support surface.

The clamping units 14 included in the illustrated injection molding machine 2 are generally of conventional construction. As will be appreciated, the invention herein disclosed may be practiced with many different types of clamping units. Generally, it is preferable that the clamping units or other mold handling device be substantially identical in construction for efficient and economical operation of the machine. Accordingly, in the illustrated preferred embodiment, the clamping units 14 are of like construction.

As seen in FIGS. 1 and 2, the clamping unit 14 at each molding station comprises a stationary lower clamp assembly 40 and a vertically movable upper clamp assembly 42. The lower clamp assembly 40 includes a bottom heating platen 44, back up plate 46 and an insulation sheet 48. The bottom heating platen 44, back up plate 46 and insulation sheet 48 are stacked one atop the other and mounted to and supported atop a horizontal base plate 50. In the illustrated machine, there is provided a front and rear base plate extending from one side plate 24 to the other. In this manner each base plate 50 serves as a base support for a respective pair of laterally adjacent clamping units 14 as can be seen in FIG. 1.

The base plates 50 serve as rigid supports for the lower clamp assemblies 40 to minimize mold distortions when the clamping units 14 are closed and placed under high clamping pressure. To this end, the base plates are supported along their lengths atop the lower cross beams 26. Each base plate 50 also is supported at the middle of the machine by gussets 52 and at its ends by the side plates 24. As illustrated in FIG. 1, the ends of each base plate 50 may overlap the upwardly facing side plate surface 54 which defines the bottom of the window 34.

The bottom heating platens 44 may be heated by any suitable means. In the illustrated embodiment, each bottom heating platen 44 is heated by an electric strip heater sandwiched between the bottom heating platen and the back up plate 46. Suitable conduit bracket and guard elements 60 may be employed, as desired.

The bottom heating platen 44 of each clamping unit 14 serves as a mount and support for the bottom half or part of a mold in which an article is to be molded. Any suitable means may be employed to mount the bottom mold part to the bottom heating platen. The bottom heating platen may be provided with one or more keys 62 which cooperate with key slots in the bottom mold part to properly orient the bottom mold part with respect to the bottom heating platen.

To hold the bottom mold part to the bottom heating platen 44, a bottom mold part clamping device 68 is employed. The bottom mold part clamping device 68 for each clamping unit 14 comprises a pair of opposed clamp shoes 70 each having an inwardly projecting lip for engaging the bottom mold part so that the bottom mold part may be clamped to the bottom heating platen. Each clamp shoe 70 is connected by a pair of tie rods 72 to a corresponding end of a bottom clamp plate 74. The tie rods extend through guide holes in the base plate 50 and the guide holes may be provided with suitable bushings to facilitate vertical guided movement of the tie rods and consequently the clamp shoes. Springs 76 are interposed between the clamp shoes and the base plate normally to bias the clamp shoes to an elevated position allowing the bottom mold part to be slid onto the bottom heating platen with opposite side edge portions thereof passing beneath the inwardly extending lips of the clamp shoes. The upper limit of the clamp shoes is determined by a clamp screw 78 threaded in the bottom clamp plate. The upper end of the clamp screw bears against the bottom of the lower cross beam 26, and the lower end of the clamp screw is provided with a hand wheel 80. As one skilled in the art will readily appreciate, the hand wheel may be rotated to lower the clamp shoes thereby to clamp the bottom mold part to the bottom heating platen. In FIG. 2, a fragment of a bottom mold part is indicated at 82.

Similar to the lower clamp assembly 40, the upper clamp assembly 42 of each clamping unit 14 comprises a top heating platen 86, an insulation sheet 88 and a back up plate 90. The top heating platen, back up plate and insulation sheet are mounted in stacked relationship to the underside of a top platen mounting plate 92. The top platen mounting plate is secured to the lower ends of a pair of guide rods 94 slidable in suitable bushings mounted to the upper cross beams 28. In this manner the top platen 86 is guided for vertical movement with the top platen being maintained parallel to and vertically aligned with the corresponding bottom platen 44 which is fixedly mounted to the bottom platen mounting plate 50.

A top mold part clamping device 100 is provided for mounting the top half or part of the mold to the underside of the top platen 86 of each clamping unit 14. The top mold part clamping device 100 essentially is functionally the same as the bottom mold part clamping device 68 and essentially also the same structurally except that each one of the opposed clamp shoes 102 is provided with its own clamp screw 104 and upper clamp plate or bar 106. As shown, each clamp shoe 102 is tied by a pair of vertical tie bars 108 to the clamp bar 106. The clamp screw 104 is threaded through the clamp bar and has its lower end bearing against the top side of the top platen mounting plate 92. The upper end of the clamp screw is provided with a hand wheel 110 for rotating the clamp screw for raising and lowering the clamp shoe. Preferably a spring 112 is interposed between the clamp shoe and the top platen mounting plate normally to bias the clamp shoe downwardly.

To open and close each clamping unit 14, the upper clamp assembly 42 is vertically raised and lowered by a hydraulic piston-cylinder assembly 120 or other suitable actuator. In addition to opening and closing the clamping unit, the piston-cylinder assembly 120 is operated to apply the high pressure squeeze to the mold parts clamped in the closed clamping unit. As shown, the cylinder 122 of the piston-cylinder assembly 120 is mounted to a mounting plate 124 which is secured to the underside of the adjacent pair of upper cross beams 28, and it can be seen in FIG. 2 that cylinder extends vertically upwardly between the upper cross beams 28. The rod of the piston-cylinder assembly has its lower end secured at an attachment block 128 to the top platen mounting plate 92.

In operation of each clamping unit 14, pressurized hydraulic fluid is supplied to the cylinder 122 of the piston-cylinder assembly 120 to extend the rod to close the clamping unit and apply high pressure squeeze to the mold parts clamped between the top and bottom platens. When thusly closed under high pressure, uncured rubber molding material is then injected into the cavity of the mold by the injection unit 16.

The injection unit 16 employed in the illustrated injection molding machine 10 is generally of conventional construction. As will be appreciated, the invention herein disclosed may be practiced with many different types of injection units. In the illustrated embodiment, a single injection unit is located centrally of the four molding stations/clamping units. However, principles of the invention may be applied to machines employing a single injection unit and two or more molding stations/clamping units, or to machines employing two or more injection units each having associated therewith two or more molding stations/clamping units.

As seen in FIGS. 1-3, the illustrated injection unit 16 comprises an inject screw 136 which is rotatable and axially movable in an inject barrel 138. The inject barrel 138 is surrounded by a water jacket 140. The inject barrel over a portion thereof surrounded by the water jacket 140 has a reduced outer diameter surface forming with the water jacket an annular space 142 for circulation of temperature control media such as water to control the temperature of a charge of uncured rubber molding material contained in the inject barrel 138. Usually cooling water or other coolant is circulated around the inject barrel to prevent premature curing of the uncured rubber molding material.

At the upper end of the inject barrel 138/water jacket 140 assembly, the injection unit 16 has a cylinder mounting plate 144 to which the cylinders of a pair of inject piston-cylinder assemblies 146 are mounted. The inject piston-cylinder assemblies are diametrically opposed in relation to the center axis of the inject barrel 138 and have their rods attached to a bearing housing mounting plate 148. Mounted to the bearing plate 148 is a bearing housing 150 which in conventional manner connects inject screw motor 152 to the inject screw 136. The motor 152 preferably is of hydraulic type and is operated to rotate the inject screw 136 to load a charge of uncured rubber molding material into the inject barrel 138.

The mounting plate 148 is guided for vertical movement on four vertical guide rods 158 mounted at their lower ends to the cylinder mounting plate 144. The vertical guide rods 158 extend through guide holes at respective corners of the rectangular shape mounting plate 148. Preferably the upper ends of the guide rods 158 are tied together by a top plate 160 to maintain their parallelism.

In operation of the injection unit 16, the inject screw drive motor 152 is operated to rotate the inject screw 136 to load uncured rubber molding material into the inject barrel 138 from a suitable source of such material, as is a well known procedure. As a charge of uncured rubber molding material is introduced into the inject barrel 138, the inject screw 136 will rise in the inject barrel and raise the mounting plate 148 and consequently cause the inject piston-cylinder assemblies 146 to extend. After the desired quantity of uncured rubber molding material has been charged in the inject barrel 138, the inject piston-cylinder assemblies 146 are retracted to inject the charge of material through the screw barrel nozzle 164 into the injection manifold assembly 18.

As best seen in FIG. 3, the screw barrel nozzle 164 is received in the center bore of the inject barrel 138 and has a nozzle extension 166 projecting from the bottom end of the inject barrel 138 and into an inlet bore 168 in manifold 170 of the injection manifold assembly 18. The nozzle end of the inject screw 136 can also be seen in FIG. 3 to include a check valve ball 172 retained by a pull pin 174 in an axial center bore at the lower end of the inject screw 136. FIG. 3 also shows a clamp ring 178 which mounts the injection unit at the lower end of the inject barrel 138 to the manifold 170 of the injection manifold assembly 18.

With reference to FIGS. 3-6, a preferred form of manifold 170 can be seen to be a block into which various ports, passages and bores have been drilled or otherwise machined into the block. Although this particular form of manifold block is preferred, it should be understood that the manifold block may take other functionally equivalent forms. For example, the manifold block may be formed of two or more parts or sections as might be desired to facilitate fabrication in some instances. The manifold assembly 170 is located centrally of the four clamping units and is supported I-beam structure 180 secured between the side plates 24.

Figure 5:
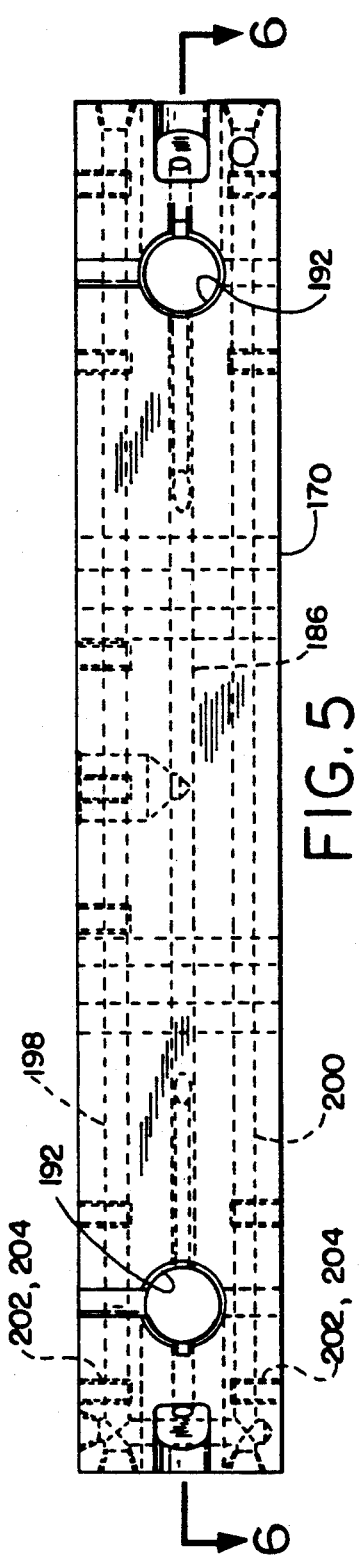
FIG. 5 is a front side elevation view of the injection manifold assembly with parts thereof removed.
Figure 6:
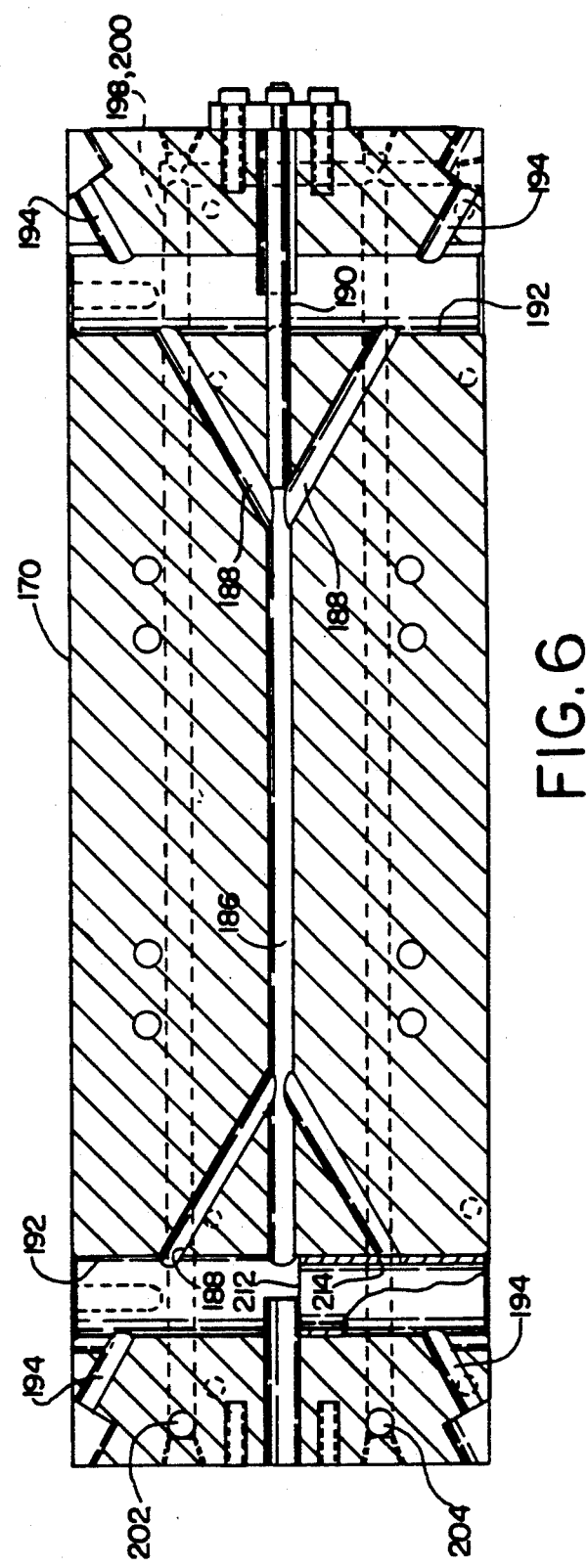
FIG. 6 is a horizontal section through the injection manifold block, taken along the line 6—6 of FIG. 5.

The manifold or manifold block 170 includes an inlet port or passage 184 into which the uncured rubber molding material is injected from the injection unit 16. The inlet port 184 is connected to a main delivery passage 186 which extends along the major or longitudinal axis of the manifold block 170 as seen in FIGS. 5 and 6. The inlet port connects to the main delivery passage 186 at a point about midway between branch delivery passages 188. There are two branch delivery passages 188 which extend from each end of the main delivery passage 186 generally in a Y-shape arrangement. In the illustrated embodiment, the ends of the main delivery passage 186 are closed by a plug 190 at a location longitudinally outwardly of the intersection between the branch delivery passages 188 and the main delivery passage. The branch delivery passages 188 terminate at a transverse slide nozzle bore 192. The various bores may be drilled using conventional fabricating techniques and the ends thereof closed by plugs or the like to provide the described network of passages in the manifold block. For example, plugs would be provided at bore segments 194 in FIG. 6 where parts are removed for illustration purposes.

The manifold block 170 also is provided with a network of cooling passages including, in particular, upper and lower U-shape passages 198 and 200 through which a temperature control media such as water may be circulated to control the temperature of the manifold block. As shown, the ends of the U-shape passages have inlet/outlet ports 202 and 204 opening to the top and bottom sides of the manifold block near one end thereof, and the inlet/outlet ports may be suitably threaded to receive fittings for coupling to temperature control media supply and return lines.

The slide nozzle bores 192 extend transversely with respect to the longitudinal axis of the manifold block 170. Each slide nozzle bore 192 is aligned with front and rear clamping units 14 at a corresponding end size of the machine.

Each slide nozzle bore 192 has disposed therein a pair of oppositely disposed slide nozzles (nozzle members) 210 for sliding axial movement. Preferably liners 212 are provided in the slide nozzle bore 192 for relatively friction free sliding movement of the slide nozzles 210. As seen at the lower left in FIG. 6, each liner 212 has an opening 214 in the cylindrical wall thereof for permitting communication between the interior of the slide nozzle bore and a corresponding branch passage 188. The liner may be suitably keyed at 216 (FIG. 4) to prevent the liner from rotating in the bore 192.

As seen in FIGS. 4 and 7, each slide nozzle 210 includes a generally cylindrical body 220. The cylindrical body 220 has a relatively long inner cylindrical portion 222, a relatively shorter outer cylindrical portion 226 and a reduced diameter neck portion 224 extending between the inner and outer portions. At its outer end, the slide nozzle body 220 has an axial bore into which a nozzle end piece 228 is threaded. The nozzle end piece 228 at its outer or exposed end has a flat sealing surface 230. At the center of the sealing face 230 there opens at a nozzle outlet 231 an axial transfer passage 232 in the nozzle piece which connects at a flared entranceway 234 to a relatively large diameter transfer passage 236 in the slide nozzle body 220. The transfer passage 236 extends axially to the left in FIG. 7 to an angled passage 238 which opens to the outer diameter surface of the slide nozzle body 220 at an opening 240.

As seen in FIG. 4, the slide nozzles 210 in each slide nozzle bore 192 have the inner cylindrical portion 222 of their bodies 220 received in respective ends of the bore 192 for axial sliding movement. The reduced diameter neck portion 224 of each slide nozzle body is located outwardly of the manifold block 170 to permit attachment thereto of a slide nozzle clamp 246. The slide nozzle clamp 246 forms a part of a slide nozzle actuator assembly 248 which operates to shift the slide nozzle axially back and forth to move the same into and out of operative engagement with a corresponding mold in the manner hereinafter described. The slide nozzle actuator assemblies 248 for the front and rear slide nozzles are essentially the same except that one is mounted to the underside of the manifold block 170 whereas the other is oppositely oriented and mounted to the top side of the manifold block as best seen in FIG. 4.

As seen in FIGS. 3 and 4, each slide nozzle actuator assembly 248 further includes a piston-cylinder assembly 252 preferably of hydraulic type. The cylinder of the assembly is mounted to the top/bottom of the manifold block 170 with its axis extending parallel to the movement axis of the corresponding slide nozzle 210. Attached to the rod of the piston-cylinder assembly is a slide nozzle bracket 254 to which the slide nozzle clamp 246 is attached. The slide nozzle bracket 254 has a relatively thin key portion 256 extending inwardly from the slide nozzle clamp. The key portion 256 is received in a key slot 258 provided in the manifold block for back and forth reciprocating movement, and the key 256 and key slot 258 cooperate to prevent the slide nozzle from rotating in the slide nozzle bore during axial shifting movement of the slide nozzle. As diagramatically illustrated at 260 in FIG. 3, suitable controls and implementing means are provided to control operation of the nozzle actuator assemblies as well as other aspects of the machine's operation. Suitable limit switches or other means may also be provided for purposes of controlling extension and retraction of each hydraulic piston-cylinder assembly 252.

In the manner discussed further below, each piston-cylinder assembly 252 is operated to move the corresponding slide nozzle 210 into and out of engagement with a mold at the corresponding molding station. When extended to engagement with a mold as seen at the right in FIG. 4, the opening 240 in the slide nozzle aligns and establishes communication with (connects with) the corresponding branch passage 188 so that uncured rubber molding material injected into the manifold block 170 will flow through the main delivery passage 186 via the branch passage 188 to and through the passage in the slide nozzle for injection into the mold. Preferably the slide nozzle is held by the slide actuator assembly 248 in pressure engagement at its sealing face 230 with a confronting flat sealing surface of the mold to form a seal at their point of juxtaposition, as seen in FIG. 4 at the right. Of course, the mold would be provided with a passage (not shown) for communicating with the passage in the slide nozzle for transfer of molding material from the nozzle into the mold during the injection process. Preferably the stationary bottom part of the mold has the injection inlet passage and cooperating sealing surface to minimize the possibility of misalignment.

When the slide nozzle 210 is retracted the opening 240 therein is shifted out of communication with the corresponding branch passage 188 and the inner cylindrical portion 222 of the slide nozzle moves to block the end of the branch passage to prevent any flow of molding material therethrough, as seen at the lower left in FIG. 5. In this manner the slide nozzle functions as a valve for establishing and shutting off flow in relation to the corresponding mold.

It can now be seen that the manifold assembly 18 comprises a slide nozzle 210 for each clamping unit 14. Moreover, each slide nozzle can be selectively operated independently of the other slide nozzles to move into engagement with a mold clamped in the corresponding clamping unit for permitting passage of molding material from the injection unit via the manifold assembly to the mold. Each slide nozzle also can be selectively operated independently of the other slide nozzles to block the passage therethrough of molding material injected into the manifold assembly.

With the foregoing in mind, a preferred mode of operating the injection machine 2 will now be described. Normally the machine would be set up to include a mold in each clamping unit 14. After set-up the machine may be operated in the following sequence.

To commence machine operation, a first clamping unit 14 in a first molding station is closed to clamp the mold therein. At an appropriate time, such as after closure of the clamping unit, the corresponding slide nozzle 210 is extended into sealed engagement with the mold in the first clamping unit. Then, the injection unit is operated to inject a charge of uncured rubber molding material into the mold via the extended slide nozzle.

At this time the slide nozzles 210 associated with the clamping units (molding stations) would be retracted to block any flow therethrough of the molding material being injected into the manifold assembly, unless it is desired to effect simultaneous injection of molding material into more than one mold. This normally would not be desired as it would decrease control over the quantity of molding material injected into each mold, however the machine would have this capability nonetheless through appropriate programming of the machine's operation.

After being injected with a charge of molding material, the mold in the first clamping unit may be subjected to heat and pressure in conventional manner for a prescribed time to cure the molding material thereby to form a molded product. After the prescribed cure time, the clamping unit may be opened and the molded part removed from the mold so that the mold may again be closed for injection therein of another charge of molding material.

While these activities associated with the first clamping unit are taking place, the injection unit 16 may be operated to inject a second charge of molding material into a mold clamped in a second clamping unit, sequentially followed by injection of a third charge into the mold clamped in a third clamping unit, and then a fourth charge into the mold clamped in the fourth clamping unit. In each case, the slide nozzle corresponding to the mold into which molding material is to be injected is extended into engagement with the mold while the slide nozzles associated with the other clamping units are retracted and thus closed. Accordingly, the injection manifold assembly 18 may be operated sequentially to inject a charge of molding material into molds clamped in the clamping units. Hence, during the curing and unloading phases of any one clamping unit, the injection unit may continue to be operated to inject respective charges of molding material into molds clamped in the other three clamping units in sequence.

The advantages of the above described rubber molding machine will be immediately apparent to the skilled artisan. As will be appreciated, the operative capacity of an injection unit will be quadrupled in relation to a single injection unit, single molding station/clamping unit machine. The above described rubber molding machine also is not subject to at least some of the problems associated with prior art multi-station rubber injection machines. One such problem is the alignment problem associated with those machines wherein the injection unit is moved from station to station. In the above described machine, only a relatively small and low mass nozzle element is moved and consequently problems with leakage, alignment, wear are minimized or eliminated. Moreover, no expensive mechanisms are needed to move and stop a large injector.

Respecting materials that may be molded in machines embodying one or more principles of the invention, such materials include rubber compounds including sponge rubber compounds. Generally most elastomers would be moldable in the machine and the molding of plastics is not foreclosed.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the following claims.

What is claimed is:

1. A multi-station rubber injection molding machine comprising first and second molding stations for respective molds, a rubber injection unit, means for maintaining said injection unit at a position fixed in relation to said molding stations, and manifold means for selectively transferring uncured rubber molding material from said rubber injection unit when in said fixed position to a mold in either one of said first and second molding stations, said manifold means including inlet means for receiving molding material from said injection unit, first and second nozzle members including respective transfer passages, said first and second nozzle members each being movable from a first position to a second position for operatively connecting the transfer passage in the nozzle member to a respective mold, and said first and second nozzle members each operating to connect the transfer passage therein to said inlet means when in said second position and to disconnect the transfer passage therein from said inlet means when in said first position.

2. An injection molding machine as set forth in claim 1, including first and second actuator means for moving respective ones of said first and second nozzle members between said first and second positions independently of movement of the other nozzle member.

3. An injection molding machine as set forth in claim 2, wherein each one of said first and second actuator means includes a piston-cylinder assembly and means for connecting the rod of said assembly to the corresponding nozzle member.

4. An injection molding machine as set forth in claim 3, wherein said manifold means includes a manifold block in which said nozzle members are slidably movable.

5. An injection molding machine as set forth in claim 1, wherein each molding station comprises a clamping unit.

6. A multi-station rubber injection molding machine comprising first, second, third and fourth molding stations for respective molds, a rubber injection unit, means for maintaining said injection unit at a position fixed in relation to said molding stations, and manifold means for selectively transferring uncured rubber molding material from said rubber injection unit when in said fixed position to a mold in any one of said first, second, third and fourth molding stations, said manifold means icluding a manifold block including at opposite ends thereof a pair of bores aligned with respective pairs of said molding stations, a pair of nozzle members in respective ones of said pair of bores, the nozzle members of each said pair thereof being oppositely disposed and each being movable into and out of engagement with a mold in the corresponding molding station, said manifold block including inlet means for receiving molding material from said injection unit, said inlet means being located between said bores and communicating with said bores via respective delivery passages each terminating at a bore opening in the wall of a respective one of said bores, said nozzle members each having a body including a transfer passage having an inlet opening and a nozzle outlet opening, and said inlet opening being aligned with the corresponding bore opening when the respective nozzle member is moved into engagement with the corresponding mold and out of alignment when the nozzle member is moved out of engagement with the mold.

7. An injection molding machine, comprising a plurality of molding stations for respective molds, an injection unit, and a manifold assembly, said manifold assembly including inlet means for receiving molding material from said injection unit, a plurality of nozzle members each including a transfer passage and being movable into and out of operative engagement with a mold in the respective molding station, and each said nozzle member having associated therewith means for connecting and disconnecting the transfer passage therein to said inlet means respectively in response to movement of said nozzle member into and out of operative engagement with the mold.

8. An injection molding machine as set forth in claim 7, wherein at least two said nozzle members each have associated therewith respective actuator means for moving the nozzle member independently of movement of the other one of said two nozzle members.

9. An injection molding machine as set forth in claim 8, wherein each one of said first and second actuator means includes a piston-cylinder assembly and means for connecting the rod of said assembly to the corresponding nozzle member.

10. An injection molding machine as set forth in claim 9, wherein said manifold assembly includes a manifold block in which said nozzle members are slidably movable.

11. An injection molding machine as set forth in claim 7, wherein each molding station comprises a clamping unit.

12. An injection unit as set forth in claim 11, wherein there are four clamping units in a rectangular arrangement, and said manifold assembly includes a manifold block located generally centrally of said four clamping units and four said nozzle members slidably movable in said manifold block at locations adjacent respective ones of said four clamping units.

13. An injection molding machine as set forth in claim 12, including means for controlling the temperature of said manifold block.

14. An injection molding machine as set forth in claim 13, wherein said means for controlling includes passages in said manifold block for flow of temperature control media.

15. An injection molding machine as set forth in claim 12, wherein said manifold block includes a longitudinally extending main delivery passage in communication at a central location with said inlet means, and a pair of branch passages at each opposite end of said main delivery passage, each said branch passage terminating at a bore in said manifold block in which a respective one of said nozzle members is movable.

16. An injection molding machine as set forth in claim 15, wherein each said pair of branch passages forms a Y with the main delivery passage.

17. An injection molding machine as set forth in claim 7, wherein said injection unit is mounted to and supported by said mainfold assembly.

18. An injection molding machine as set forth in claim 7, wherein said manifold assembly includes a manifold block in which said nozzle members are slidably movable, and including means for mounting said manifold block in fixed relation to said plurality of molding stations.

* * * * *